Patented Feb. 17, 1942

2,273,725

UNITED STATES PATENT OFFICE 2,273,725

TAR

Philip A. Ray, Wilmington, Del., assignor to Hercules Powder Company, Wilmington, Del., a corporation of Delaware No Drawing. Application October 8, 1940, Serial No. 360,263

16 Claims. (Cl. 252—1)

This invention relates to a tar derived from pine wood resin containing at least 15% of gasoline-insoluble resinous material, and to the process of making the same.

It is an object of the present invention to provide a tar derived from pine wood resin containing a relatively high content of gasoline-insoluble resinous material. Another object is to devise a process for making such a tar. Still other objects will more fully hereinafter appear.

In accordance with the present invention a pine wood resin containing at least about 15% of gasoline-insoluble resinous material is destructively distilled in any suitable manner which would result in the formation of a residual pitch if the entire distillate were removed, and the distillation residue is blended with an oily medium miscible therewith. Preferably the residue is blended with the oily portion of the distillate formed by the distillation.

The resinous raw material employed in carrying out the present invention is characterized by being substantially completely resinous throughout, and by a content of at least 15% by weight, and preferably at least about 35% of gasoline-insoluble resinous material. The material is further characterized by being almost completely soluble in such solvents as benzene, toluene, xylene, etc.

The total resinous extract of pine wood, such as is obtained by extracting pine wood with benzene, consists of pale rosin, gasoline-insoluble resinous material, and color bodies. Upon the treatment of such resinous extract to separate therefrom a fraction of pale rosin there is formed one or more fractions containing the balance of the resinous material derived from the pine wood. My invention may use one or more of such fractions as the raw material. Such raw material may be derived by the purification of wood rosin and is characterized by a relatively high content of gasoline-insoluble resinous material, that is at least 15%. The non-rosin portion of the pine wood extract may be separated by appropriate processes into a fraction of substantially gasoline-insoluble resinous material and a dark-colored intermediate fraction lying between the gasoline-insoluble fraction and rosin. It is impossible to effect an absolutely clean separation between the gasoline-insoluble resinous material and the rosin. By the preparation of a dark-colored intermediate fraction containing some gasoline-insoluble resinous material and the color bodies, a fairly good separation of the pine wood extract into rosin, gasoline-insoluble resinous material, and into this intermediate fraction is effected.

Thus, I may use as the resinous raw material a resinous material obtained from pipe wood and containing from about 15% to about 35% of gasoline-insoluble resinous material, or the dark colored fraction largely insoluble in petroleum hydrocarbons and obtained by the refining of impure wood rosin to pale grades by means of a selective solvent for color bodies such as furfural, or a selective absorbent such as fuller's earth, or the substantially completely gasoline-insoluble resinous material obtained from pine wood, mixtures of such fractions and equivalent resinous materials. As an example of a mixture, I may use a blend of the dark colored fraction and the substantially gasoline-insoluble fraction, obtained for example from pipe wood without separation into the individual fractions, either by a process which involves leaving the rosin in the wood or by a process which involves separation of the rosin. The raw material preferably contains at least about 35% of gasoline-insoluble resinous material, varying therefrom up to about 100%.

The dark colored fraction referred to above is a product resulting from the process used in decolorizing rosin. For example, so-called FF rosin, which is ruby red in color and is derived from pine wood by extraction with benzene followed by evaporation of the benzene and extraction of the resinous residue with a petroleum hydrocarbon such as hot petroleum ether or hot gasoline, is decolorized by adding furfural to the hot solution, agitating the mixture, and then allowing the mixture to form a liquid layer system in which the furfural layer contains the unsaponifiables and coloring bodies in the original FF rosin and the gasoline layer contains the pale rosin. The furfural layer is separated from the gasoline layer and distilled to recover the furfural, the residue remaining being the dark-colored intermediate fraction referred to. This fraction contains most of the unsaponifiables and coloring bodies from the original FF rosin as well as a good proportion of the rosin acids. It contains a large proportion of oxidized rosin acids and therefore is only partially soluble in petroleum hydrocarbon solvents at room temperature. The percentage of gasoline-insolubles varies from about 35% to about 75% by weight. It has a higher flow point, a much higher viscosity, lower acid number, and a higher unsaponifiable content than FF wood rosin. However, the saponification number is not correspondingly lower, indicating a high ester content. In addition, it is non-crystallizing. Such a fraction is characterized by the following approximate analysis:

| | | |
|---|---|---|
| Unsaponifiables | per cent | 10–20 |
| Gasoline insolubles | do | 35–75 |
| Acid number | | 100–130 |
| Saponification No. | | 140–150 |
| Melting point (drop) | °C | 85–95 |

A typical example of such a fraction had the the following analysis: acid number, 124; saponification number, 150; melting point (drop), 89° F.; gasoline insoluble, 57%; unsaponifiable matter, 12%; Lovibond color, dark; ash content, 0.03%.

The substantially gasoline-insoluble fraction referred to above may be prepared from pine wood by the process set forth in U. S. patent to Hall, No. 2,193,026 or by the process described in the U. S. patent to Hall, No. 2,221,540. This fraction is characterized by using substantially completely insoluble in petroleum hydrocarbons and particularly in gasoline. The gasoline soluble portion of this fraction rarely exceeds 15% by weight. This fraction may be said to be the gasoline insoluble resin contained in pine wood. For example, the extraction of pine wood with benzene yields a mixture of this fraction and FF rosin. Upon commingling the molten resinous mixture with a mixture of gasoline and a relatively small volume of furfural, the fraction in question goes into solution in the furfural while the FF rosin goes into solution in the gasoline. The two layers are allowed to separate and the resinous materials may then be recovered from the respective layers in any suitable manner.

The substantially completely gasoline-insoluble fraction is in general characterized by a methoxy content of from about 3% to about 6%, an acid number of from about 90 to about 100, a melting point (drop method) of from about 110° C. to about 125° C., petroleum ether or gasoline insolubility of about 85% or more, and a saponification number of from about 135 to about 145. A typical specimen had the following characteristics: drop melting point, 115° C.; acid number, 93; gasoline soluble matter, 12%; toluene insoluble matter, 20%; saponification number, 140; ash content, 0.02%.

In general, the resinous raw material which is employed in carrying out the present invention and which is typified by the dark-colored fraction, the substantially completely gasoline-insoluble fraction, or blends thereof, may be defined as a resin naturally occurring in pine wood and characterized by a gasoline-insolubility of 15% or more, and preferably 35% or more, unsaponifiable content of from about 5% to about 20%, melting point above 85° C. and preferably in the neighborhood of 90° C. or above, and an acid number of not over about 140.

In accordance with the present invention, the resinous raw material is destructively distilled, preferably in an inert atmosphere such as carbon dioxide, and in either the presence or absence of a decarboxylating catalyst. An example of a preferred decarboxylating catalyst is p-toluene sulfonic acid. Examples of other decarboxylating catalysts are: fuller's earth, zinc chloride, phosphoric acid, benzene sulfonic acid, phosphorus pentoxide, and sodium acid sulfate.

The resin is destructively distilled at a temperature sufficient to effect formation of a resinous oil by decomposition of the resin and sufficient to form a residual pitch were the entire distillate removed during the distillation. Temperatures ranging from about 300° C. to about 400° C. are operable, the preferred temperature range covering from about 330° C. to about 375° C. and still more preferably from about 355° C. to about 370° C. In general, temperatures below about 355° C. do not give the desired low viscosity of the product while temperatures above about 370° C. tend to produce free carbon which is undesirable. Heating periods of from about 30 minutes to about 25 hours are operable depending upon the temperature and pressure maintained, size of charge, presence or absence of decarboxylating catalyst, etc. In general, the distillation is continued until the resin has been sufficiently decomposed. The distillation may be effected either by superheated steam or by direct fire under the still or preferably by both. The distillation may be conducted under atmospheric or superatmospheric pressure.

The distillate comprises an oily material and a considerable amount of water. In addition, appreciable amounts of non-condensable gases and "spirits" or low boiling material are formed and come over during the distillation.

The oily portion of the distillate, namely that portion which boils at above 100° C. and which is insoluble in water, is blended with the residual pitch or charge in order to yield a tar of the desired properties. This blending may be accomplished in the following ways, among others.

(1) The entire distillate is removed during the distillation, condensed and collected, after which the aqueous layer is separated from the oily layer, the oily layer completely dehydrated if desired, as for example, by heat or by suitable chemical treatment and added to the residual pitch which has, after the completion of the distillation, been allowed to cool down to from about 100° C. to about 250° C. The mixture is stirred until a uniform tar is obtained.

(2) The distillation is conducted at atmospheric pressure and the water-free oily portion of the distillate is refluxed throughout the distillation. In order to accomplish this any suitable refluxing apparatus may be used which permits the water and "spirits" to pass over and which refluxes only absolutely dry oil. For example, the reflux condenser may be maintained at a temperature just above 100° C. so that it returns all oily distillate boiling at above 100° C. but does not return the water or "spirits".

(3) The distillation is conducted under superatmospheric pressure sufficient to maintain the temperature of the charge at the desired level and to increase the rate of decomposition of the charge, the water-free oily portion of the distillate being refluxed continuously throughout the distillation. Refluxing is conducted in such manner that water and "spirits" are not refluxed. The pressure may be maintained constant throughout the distillation or may be varied as the distillation proceeds in accordance with the results desired. The pressure employed may vary upwardly from atmospheric to say up to about 100 atmospheres.

(4) The resinous raw material is heated in a closed space, pressure being allowed to build up as decomposition takes place, after which the reaction mixture is distilled to remove the water and "spirits," leaving the blend of pitch and oils behind. Or the vessel may be equipped with a suitable relief valve designed to allow the non-condensable gases, water, and "spirits" but not the oils to pass off and to limit the pressure to a safe or desired figure.

When proceeding in acordance with any of the foregoing procedures, a part or all of the oily portion of the distillate may be blended back with the pitch in the manner referred to, depending upon the properties of the tar obtained.

The blending is most suitably accomplished in accordance with procedure 3 above which enables the maintenance of the temperature at the optimum point and an increase in the speed of distillation. It will be understood that procedure No. 2 may in some cases be undesirable because the continuous refluxing of the oils may cool the charge to an objectionably low temperature, thereby interfering with the progress of the distillation.

If desired, additional resin oil of the type produced during the distillation or of a similar type, in addition to that derived from the original resin may be blended with the pitch, and in this way a tar of still lower viscosity may be obtained. For example, the resin oil derived from the distillation may be blended with the pitch followed by blending of the resulting tar with resin oil derived from another run.

The proportion of resin oil blended with the pitch may vary within wide limits, for example within the range of from about 10% to about 1000% by weight based on the weight of the pitch.

Instead of blending the pitch with an oil derived by destructive distillation of a pine wood resin identical with that undergoing distillation, it may be blended with an oil derived by destructive distillation of any pine wood resin containing at least 15%, and preferably at least 35%, of gasoline-insoluble resinous material. For example, the pitch from the dark-colored fraction may be blended with oil derived from the substantially gasoline-insoluble fraction, the pitch from the substantially gasoline-insoluble fraction may be blended with the oil derived from the dark-colored fraction, etc.

While it is preferred to blend the pitch with resin oil which is derived by the destructive distilation, in the foregoing manner, of a pine wood resin containing at least 15% of gasoline-insoluble resinous material, less advantageously this type of blending oil may be replaced partially or completely with other resin oils miscible with the pitch and obtained by destructive distillation of a pine wood resin such as for example, rosin oil, or, still less preferably, of other natural resins such as copal resin oil, dammar resin oil, pontianak resin oil, kauri resin oil, etc.

The yield of pitch ranges upwardly from about 30% by weight based on the weight of original resin. When this pitch is blended with the resin oil portion of the distillate, the total yield of tar from a given lot of resin may range as high as from about 75% up to about 90% by weight. The percentage of water will usually run about 5% to 15% by weight. The percentage unaccounted for (the non-condensable gases) will usually be from about 5% to 15% by weight.

The relative proportions of resin oil and pitch obtained by the distillation will depend upon the particular raw material employed, the temperature of treatment, and other factors. Generally speaking, the percentage of oil obtained will vary between about 10% and about 150% by weight of the pitch.

While the distillation will generally be onducted by a batch operation, it may, with suitable modification, be effected by a continuous operation, for example, using a still into which molten resinous raw material is continuously passed and subjected to a temperature from about 300° C. to about 400° C. while cooling the distillate, continuously separating the oily portion therefrom and continuously adding the anhydrous oily portion to the pitch after it has left the distilling zone. Continuous operation in any other suitable manner may equally be used for carrying out the process.

The products of the present invention are capable of wide application in the arts where tars have been heretofore employed and may be used in place thereof with generally improved results. The tar products of the present invention may be employed for example in the tarring of rope, cordage and the like, in the manufacture of oakum, in rubber compounding, in rubber reclaiming, in the manufacture of so-called tar tape, for use in the manufacture of formaldehyde resins to which they are particularly suited because of their large proportion of phenolic constituents, as frothing agents in the froth flotation of minerals, etc. The products of the present invention are extremely resistant to influences which normally tend to decompose and deteriorate the usual tarry materials such as weathering, heat, light, moisture, water, chemical influences, destruction by gasoline and other petroleum hydrocarbons, etc.

The tar products made in accordance with the present invention are characterized in general by complete freedom from acetic acid or other volatile or unstable organic acids, a very substantial content of phenolic bodies, saponification number below 100 and usually below 60, acid number from about 30 to about 50, unsaponifiable content of from about 50% or more, a methoxy content of from about 1% up to about 6%, substantially complete solubility in benzene, presence of not more than a trace of water or other moisture, and capability of being heated to at least about 350° C. without charring or other fundamental decomposition.

Below are given several specific examples in accordance with the present invention.

*Example 1*

A charge of dark-colored pine wood resinous fraction (gasoline-insoluble 57%) weighing 600 g. was heated at 330–360° C. for 7¼ hours in an atmosphere of carbon dioxide, the volatile oils and water which distilled off being continuously separated, and condensed. At the end of this time, the hot residue was allowed to cool to 250° C. whereupon the water-free oily portion of the condensate which had in the meantime ben separated from the aqueous portion and dehydrated by heating above 100° C. was added to the pitchy residue and the mixture stirred and allowed to cool. A soft pasty tar was obtained.

*Example 2*

A mixture of 450 g. of dark-colored pine wood resinous fraction (gasoline-insoluble 57%), 150 g. of substantially completely gasoline-insoluble pine wood resin (gasoline-insoluble 88%), and 0.6 g. of p-toluene sulfonic acid was charged into a still and heated at 340–360° C. in an atmosphere of carbon dioxide for ¾ hour. The oils and water which distilled off were separated and when the residue had cooled to 180° C., the water-free oils were added to it. The hot mixture was stirred and allowed to cool. A black viscous tar was obtained.

*Example 3*

A charge of dark-colored pine wood resinous fraction (gasoline-insoluble 57%) weighing 1750 g. was heated in an atmosphere of carbon dioxide at 360° C. for 4½ hours. The oils and water which distilled off were separated. When the residue had cooled to 200° C., the water-free oils were added, the mixture was stirred and allowed to cool, yielding a black viscous liquid. The pitch amounted to 1300 g., the oil 140 g., and the water 82 g. The resulting tar had the following analysis:

| | |
|---|---|
| Acid number | 14.0 |
| Saponification number | 48.5 |
| Hydroxyl (Zerewitinoff) | 0.35%* |
| Unsaponifiable matter | 56.5% |
| Benzene insoluble | Nil |
| Specific gravity | 1.068 |
| Moisture (by distillation) | Nil |
| Methoxyl | 2.65% |
| Distillation range (760 mm.): | |
| 1st drop | 135° C. |
| 5% | 201° |
| 10 | 285° |
| 15 | 321° |
| 20 | 336° |
| 25 | 339° |
| 30 | 357° |
| 35 | 362° |
| 40 | 369° |
| 45 | 371° |
| 50 | 369° |
| 60 | 373° |
| 70 | 394° |
| 70–80 | 86.9 seconds |
| Viscosity (Stormer)** | Temp. dropped and residue frothed in flask. |

*Corrected for acid number of 14.
**500 g. weight, 50 revolutions at 40° C.

*Example 4*

A charge of 1560 gallons of molten dark-colored pine wood resinous fraction (gasoline-insoluble 53–55%) was placed in a direct fired still and heated to 360° C. 8 hours were required to reach this temperature. The charge was held at this temperature for three hours. The entire distillate comprising water and oils was continuously removed and condensed. At the end of the run, the still was allowed to cool down to about 225° C. which required 12 hours. The condensate comprised 20 gallons of water and 748 gallons of oils. The oily portion was separated from the aqueous portion and dehydrated in suitable manner. The residual pitch had a volume of 752 gallons or 48.1% by volume of the original resin.

When the contents of the still had reached 225° C., 775 gallons of dehydrated resin oil (comprising the 748 gallons derived by the distillation and 27 gallons derived from another run) were pumped into the still and the mixture of pitch and oil thoroughly mixed. After three hours mixing, the resulting tar was drawn off. The material analyzed as follows:

Distillation range:

| | |
|---|---|
| 1st drop | 197° C. |
| 5% over | 262° C. |
| 10% | 296° C. |
| 20% | 333° C. |
| 30% | 340° C. |
| 40% | 358° C. |
| 50% | 360° C. |
| 60% | Break down |
| Specific gravity | 1.0762 |
| Moisture | None |
| Acid number | 31.0 |
| Saponification number | 52.0 |
| Saybolt viscosity at 100° C. | 288 seconds |

EXAMPLE 5

A charge of 1565 gallons of molten dark-colored pine wood resinous fraction (gasoline-insoluble 62%) was placed in a still and brought to 360° C., and held at this temperature for one hour. The condensate contained 687 gallons of oils. The residue of pitch in the still amounted to 813 gallons. The still charge was allowed to cool to about 200° C. whereupon the oily portion of the condensate was blended therewith giving a tar of 610 second Saybolt viscosity.

The tar produced in this manner was blended with an additional 360 gallons of resin oil obtained by destructive distillation of another batch of the same resin in the same manner. There was obtained a tar having a Saybolt viscosity of 200 seconds. This tar had the following analysis:

Boiling range:

| | |
|---|---|
| 1st drop | Water |
| 5% | 226° C. |
| 10% | 290° C. |
| 20% | 320° C. |
| 30% | 342° C. |
| 40% | 355° C. |
| 50% | 361° C. |
| 60% | Break down |
| Acid number | 33.3 |
| Moisture | 0.3% |
| Specific gravity | 1.0717 |
| Viscosity (Saybolt) | 200 seconds at 100° C. |

*Examples 6 to 10*

The tar of Example 3 was blended with additional resin oil, obtained by destructive distillation of the same resin in the same manner, in the proportions by weight indicated in the following table:

| Example | Tar | Resin oil |
|---|---|---|
| | Percent | Percent |
| 6 | 80 | 20 |
| 7 | 75 | 25 |
| 8 | 60 | 40 |
| 9 | 40 | 60 |
| 10 | 20 | 80 |

The resulting tars of varying viscosities were found to be unusually satisfactory in the fields of rubber compounding, rubber reclaiming, and in the tarring of rope and cordage.

*Example 11*

A mixture of 600 g. of substantially gasoline-insoluble pine wood resin (gasoline-insoluble 92%) and 0.6 g. of p-toluene sulfonic acid was heated at 340–360° C. in an atmosphere of $CO_2$ for ¾ hour. The oils (129 cc.) and water (30 cc.) which distilled off, were collected and separated from one another. When the residue in the still had cooled to 200° C. the water-free oils were added. The mixture was stirred and upon cooling yielded 480 g. of a hard tar.

*Example 12*

A 200 g. lot of substantially gasoline-insoluble pine wood resin (gasoline-insoluble 90%) was destructively distilled by heating on a sand bath under atmospheric pressure up to about 380° C. The condensed distilled comprised 80 g. of oils. The water-free oils were added to the residual pitch after it had cooled to about 200° C., and stirred therewith to yield a tar.

It will be understood that the details and examples hereinbefore set forth are illustrative only and that the invention as broadly described and claimed is in no way limited thereby.

What I claim and desire to protect by Letters Patent is:

1. As a new article of manufacture, a tar comprising a blend of the residue of the destructive distillation of a pine wood resin which contains at least about 15% of gasoline-insoluble resinous material, and a resin oil miscible therewith.

2. As a new article of manufacture, a tar comprising a blend of the residue of the destructive distillation of a pine wood resin which contains at least about 15% of gasoline-insoluble resinous material, and a resin oil constituting the oily portion of the distillate from the destructive distillation of a pine wood resin containing at least about 15% of gasoline-insoluble resinous material.

3. As a new article of manufacture, a tar comprising a blend of the residue of the destructive distillation of a pine wood resin which contains from about 35% to about 75% of gasoline-insoluble resinous material, and a resin oil constituting the oily portion of the distillate from the destructive distillation of a pine wood resin containing from about 35% to about 75% of gasoline-insoluble resinous material.

4. As a new article of manufacture, a tar comprising a blend of the residue of the destructive distillation of a pine wood resin which contains at least about 85% of gasoline-insoluble resinous material, and a resin oil constituting the oily portion of the distillate from the destructive distillation of a pine wood resin containing at least about 85% of gasoline-insoluble resinous material.

5. The process which comprises destructively distilling a pin wood resin which contains at least 15% of gasoline-insoluble resinous material, and blending the distillation residue with a resin oil miscible therewith to obtain a tar.

6. The process which comprises destructively distilling a pine wood resin which contains at least about 15% of gasoline-insoluble resinous material, and blending the distillation residue with an oily medium formed by destructive distillation of a pine wood resin to obtain a tar.

7. The process which comprises destructively distilling a pine wood resin which contains at least about 15% of gasoline-insoluble resinous material, and blending the distillation residue with a resin oil constituting the oily portion of the distillate from the destructive distillation of a pine wood resin containing at least about 15% of gasoline-insoluble resinous material, to form a tar.

8. The process which comprises subjecting to destructive distillation a pine wood resin which contains at least 15% of gasoline-insoluble resinous material, collecting the distillate during the distillation, separating the oily portion of the distillate from the aqueous portion thereof, and after the distillation blending the distillation residue with at least a part of said oily portion to yield a tar.

9. The process which comprises destructively distilling at atmospheric pressure a pine wood resin which contains at least about 15% of gasoline-insoluble resinous material, and during the distillation refluxing at least a part of that portion of the distillate which boils above the boiling point of water, while removing water and components of the distillate boiling below the boiling point of water, to obtain a tar.

10. The process which comprises destructively distilling under superatmospheric pressure a pine wood resin which contains at least about 15% of gasoline-insoluble resinous material, and during the distillation refluxing at least a part of that portion of the distillate which boils above the boiling point of water, while removing water and components of the distillate boiling below the boiling point of water, to obtain a tar.

11. The process which comprises destructively distilling a pine wood resin which contains at least about 15% of gasoline-insoluble resinous material, and blending the distillation residue with a substantially water-free resin oil constituting the oily portion of the distillate obtained from the destructive distillation of a pine wood resin containing at least about 15% of gasoline-insoluble resinous material, in proportions ranging from about 10% to about 1000% by weight of said medium based on the weight of said residue.

12. The process which comprises destructively distilling a pine wood resin which contains from about 35% to about 75% of gasoline-insoluble resinous material, and blending the distillation residue with a resin oil constituting the oily portion of the distillate obtained by the destructive distillation of a pine wood resin containing from about 35% to about 75% of gasoline-insoluble resinous material, to form a tar.

13. The process which comprises destructively distilling a pine wood resin which contains at least about 85% of gasoline-insoluble resinous material, and blending with the distillation residue a resin oil comprising the oily portion of the distillate obtained by the destructive distillation of a pine wood resin containing at least about 85% of gasoline-insoluble resinous material, to form a tar.

14. The process which comprises destructively distilling at a temperature of from about 330° C. to about 375° C. a pine wood resin which contains at least about 15% of gasoline-insoluble resinous material, and blending with the distillation residue the oily portion of the distillate to form a tar.

15. The process which comprises destructively distilling at a temperature of from about 355° C. to about 370° C. a pine wood resin which contains at least about 15% of gasoline-insoluble resinous material, and blending with the distillation residue the oily portion of the distillate to form a tar.

16. As a new article of manufacture, a tar comprising a blend of the residue of the destructive distillation of a pine wood resin which contains at least about 15% of gasoline-insoluble resinous material, and a rosin oil miscible therewith.

PHILIP A. RAY.

CERTIFICATE OF CORRECTION.

Patent No. 2,273,725.                                                     February 17, 1942.

PHILIP A. RAY.

It is hereby certified that error appears in the printed specification of the above numbered patent requiring correction as follows: Page 1, first column, line 59, and second column, line 13, for the word "pipe" read --pine--; page 3, first column, line 64-65, for "onducted" read --conducted--; and second column, line 49, for "ben" read --been--; page 4, first column, line 28, in the table, for "86.9 seconds" read --Temp. dropped and residue frothed in flask.--; line 29, for "Temp. dropped and residue frothed in flask." read --86.9 seconds--; and that the said Letters Patent should be read with this correction therein that the same may conform to the record of the case in the Patent Office.

Signed and sealed this 14th day of April, A. D. 1942.

(Seal)                                                        Henry Van Arsdale,
                                                                           Acting Commissioner of Patents.

CERTIFICATE OF CORRECTION.

Patent No. 2,273,725. February 17, 1942.

PHILIP A. RAY.

It is hereby certified that error appears in the printed specification of the above numbered patent requiring correction as follows: Page 1, first column, line 59, and second column, line 13, for the word "pipe" read --pine--; page 3, first column, line 64-65, for "onducted" read --conducted--; and second column, line 49, for "ben" read --been--; page 4, first column, line 28, in the table, for "86.9 seconds" read --Temp. dropped and residue frothed in flask.--; line 29, for "Temp. dropped and residue frothed in flask." read --86.9 seconds--; and that the said Letters Patent should be read with this correction therein that the same may conform to the record of the case in the Patent Office.

Signed and sealed this 14th day of April, A. D. 1942.

(Seal)

Henry Van Arsdale,
Acting Commissioner of Patents.